US011913458B2

(12) United States Patent
Kim

(10) Patent No.: US 11,913,458 B2
(45) Date of Patent: Feb. 27, 2024

(54) PUMP

(71) Applicant: LG ELECTRONICS INC., Seoul (KR)

(72) Inventor: Changjoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/795,618

(22) PCT Filed: Jan. 29, 2021

(86) PCT No.: PCT/KR2021/001256
§ 371 (c)(1),
(2) Date: Jul. 27, 2022

(87) PCT Pub. No.: WO2021/154053
PCT Pub. Date: Aug. 5, 2021

(65) Prior Publication Data

US 2023/0059460 A1 Feb. 23, 2023

(30) Foreign Application Priority Data

Jan. 31, 2020 (KR) ........................ 10-2020-0011688

(51) Int. Cl.
*F04D 29/24* (2006.01)
*F04D 17/10* (2006.01)
(Continued)

(52) U.S. Cl.
CPC ............. *F04D 17/10* (2013.01); *F04D 25/06* (2013.01); *F04D 29/2216* (2013.01);
(Continued)

(58) Field of Classification Search
CPC .... F04D 29/281; F04D 29/282; F04D 29/242; F04D 29/24; F04D 29/2216; F04D 29/30;
(Continued)

(56) References Cited

U.S. PATENT DOCUMENTS 3,816,020 A * 6/1974 Ogles .................. F04D 29/2211 415/111
4,253,798 A * 3/1981 Sugiura ............... F04D 29/2255 415/227
(Continued)

FOREIGN PATENT DOCUMENTS

CN 208024626 10/2018
KR 20-0437913 1/2008
(Continued)

OTHER PUBLICATIONS

International Search Report dated May 18, 2021 issued in Application No. PCT/KR2021/001256.

*Primary Examiner* — Woody A Lee, Jr.
*Assistant Examiner* — Behnoush Haghighian
(74) *Attorney, Agent, or Firm* — KED & ASSOCIATES, LLP

(57) ABSTRACT

The present disclosure relates to a pump.

The pump of the present disclosure includes: a housing; an impeller disposed in the housing and rotating to generate a flow of fluid; and a pump motor configured to rotate the impeller, wherein the impeller includes: a first plate having a disk shape; a boss extending vertically from a center of the first plate, and coupled to a rotating shaft of the pump motor; a plurality of blades extending from an outer circumferential surface of the boss in a radial direction of the first plate; and a second plate having a surface parallel to the first plate, spaced apart from the first plate by a predetermined distance, and connected to the plurality of blades.

10 Claims, 9 Drawing Sheets

(51) Int. Cl.

| | |
|---|---|
| ***F04D 25/06*** | (2006.01) |
| ***F04D 29/38*** | (2006.01) |
| ***F04D 29/40*** | (2006.01) |
| ***F04D 29/22*** | (2006.01) |
| *F04D 29/28* | (2006.01) |
| *F04D 29/30* | (2006.01) |

(52) U.S. Cl.
CPC ......... *F04D 29/242* (2013.01); *F04D 29/384* (2013.01); *F04D 29/403* (2013.01); *F04D 29/281* (2013.01); *F04D 29/30* (2013.01); *F05D 2210/11* (2013.01)

(58) Field of Classification Search
CPC .... F04D 29/666; F04D 29/663; F04D 29/669; F04D 29/667; F04D 17/10
See application file for complete search history.

(56) References Cited

U.S. PATENT DOCUMENTS

| | | | | | |
|---|---|---|---|---|---|
| 4,521,154 | A * | 6/1985 | Corbett | F04D 29/281 | 416/182 |
| 6,514,036 | B2 * | 2/2003 | Marshall | F04D 29/281 | 415/206 |
| 6,514,052 | B2 * | 2/2003 | Bostwick | F04D 29/281 | 416/189 |
| 6,537,030 | B1 * | 3/2003 | Garrison | F04D 29/282 | 416/185 |
| 6,623,475 | B1 * | 9/2003 | Siess | F04D 13/026 | 417/420 |
| 6,736,610 | B2 * | 5/2004 | Cifarelli | A01M 7/0021 | 415/102 |
| 7,118,345 | B2 * | 10/2006 | Wu | F04D 29/30 | 416/243 |
| 7,381,027 | B2 * | 6/2008 | Kaneko | F04D 29/282 | 416/185 |
| 7,425,113 | B2 * | 9/2008 | Peterson | F04D 29/188 | 415/55.1 |
| 7,722,311 | B2 * | 5/2010 | Peterson | F04D 29/188 | 415/55.1 |
| 7,735,188 | B2 * | 6/2010 | Shaffer | E01H 1/0809 | 15/344 |
| 7,736,129 | B2 * | 6/2010 | Matsuo | H02K 9/06 | 416/186 R |
| 8,444,370 | B2 * | 5/2013 | Gulich | F04D 29/2266 | 415/1 |
| 8,794,196 | B2 * | 8/2014 | Shimokawa | F01P 5/04 | 30/381 |
| 9,382,919 | B2 * | 7/2016 | Cheng | F04D 29/281 | |
| 9,982,384 | B2 * | 5/2018 | Shin | F04D 29/2216 | |
| 10,001,128 | B2 * | 6/2018 | Lin | F04D 29/023 | |
| 10,495,102 | B2 * | 12/2019 | Guo | F04D 17/08 | |
| 10,816,008 | B1 * | 10/2020 | Keener | F04D 29/2288 | |
| 10,935,039 | B2 * | 3/2021 | Kedelty | F04D 29/281 | |
| 11,136,989 | B2 * | 10/2021 | Sakanassi García | F04D 29/242 | |
| 11,525,454 | B2 * | 12/2022 | Liu | F04D 29/30 | |
| 2007/0160456 | A1 * | 7/2007 | Peterson | F04D 29/188 | 415/53.1 |
| 2008/0213093 | A1 * | 9/2008 | Guelich | F04D 29/2266 | 416/1 |
| 2014/0127022 | A1 * | 5/2014 | Cheng | F04D 29/281 | 416/192 |
| 2015/0308446 | A1 * | 10/2015 | Koivikko | F04D 29/2216 | 415/208.3 |
| 2015/0377246 | A1 * | 12/2015 | Tieu | F04D 29/2266 | 416/189 |
| 2016/0010271 | A1 * | 1/2016 | Shin | F04D 29/2216 | 415/208.1 |
| 2017/0184116 | A1 * | 6/2017 | Guo | F04D 1/08 | |
| 2018/0003183 | A1 | 1/2018 | Dybenko et al. | | |
| 2018/0238337 | A1 * | 8/2018 | Kneip | H02K 1/2733 | |
| 2021/0062819 | A1 * | 3/2021 | Sakanassi García | F04D 29/242 | |

FOREIGN PATENT DOCUMENTS

| | | |
|---|---|---|
| KR | 10-2009-0086062 | 8/2009 |
| KR | 10-1272495 | 6/2013 |
| KR | 10-2018-0097389 | 8/2018 |

* cited by examiner

[FIG. 1]
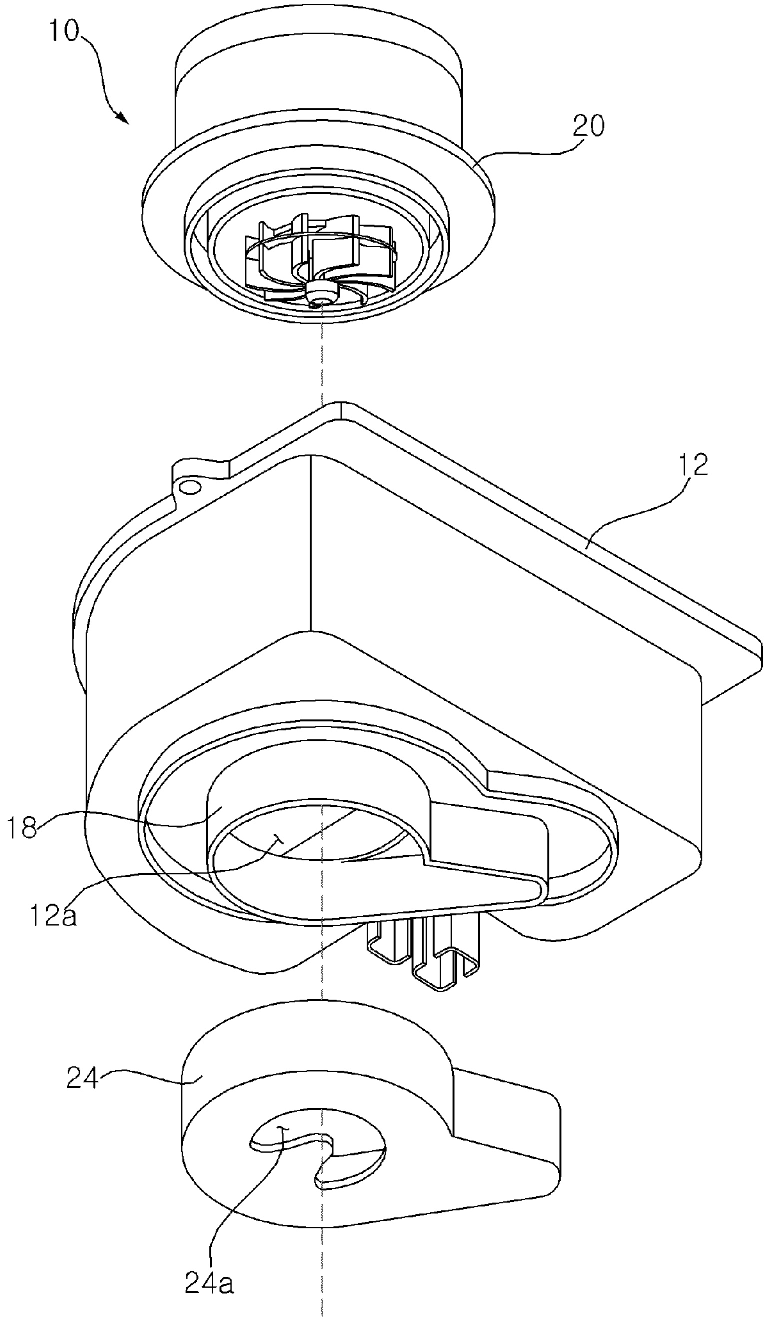

[FIG. 2]
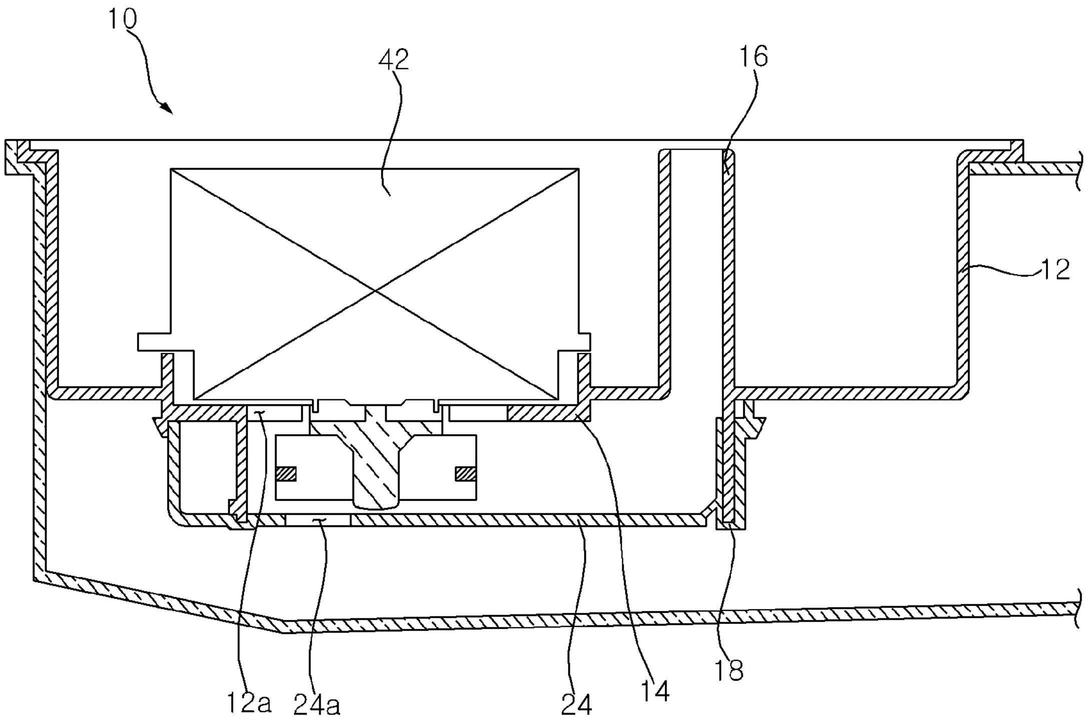

[FIG. 3A]
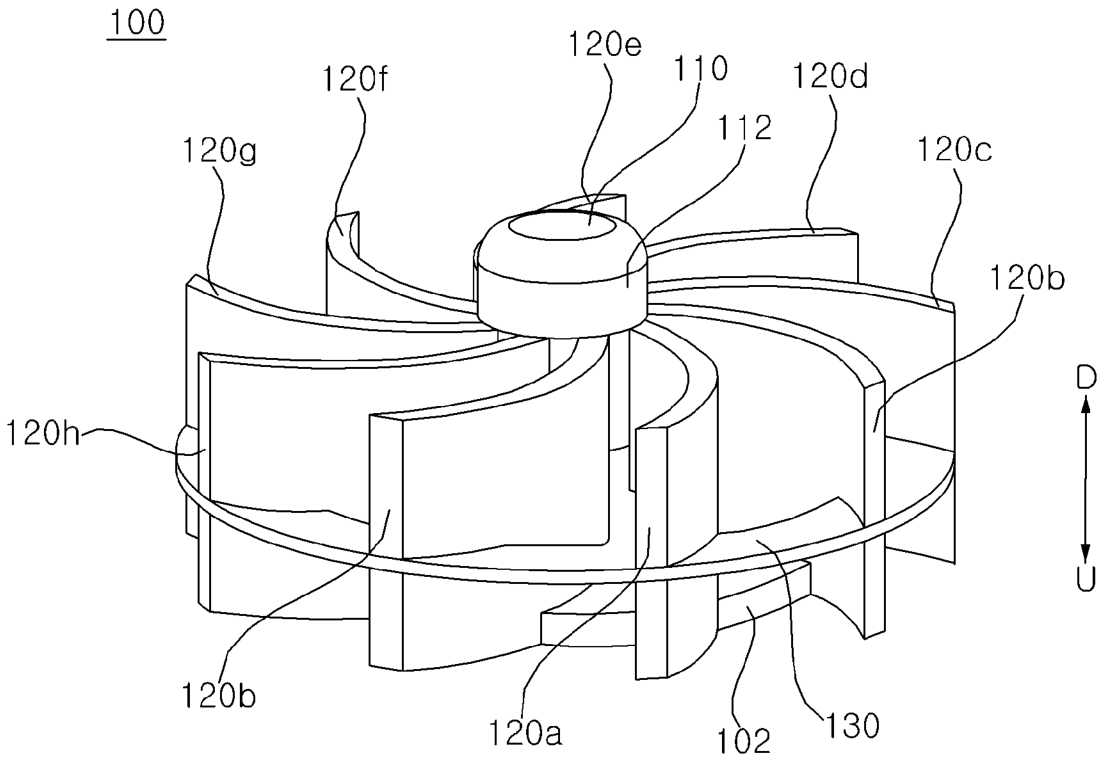

[FIG. 3B]
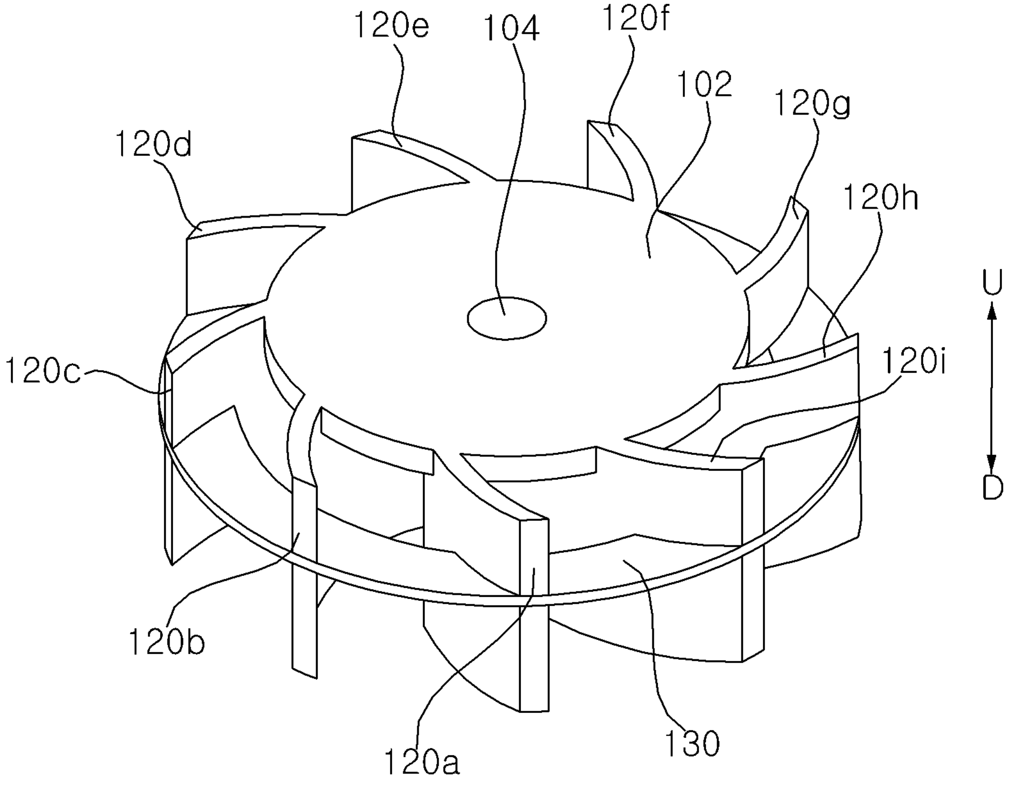

[FIG. 3C]
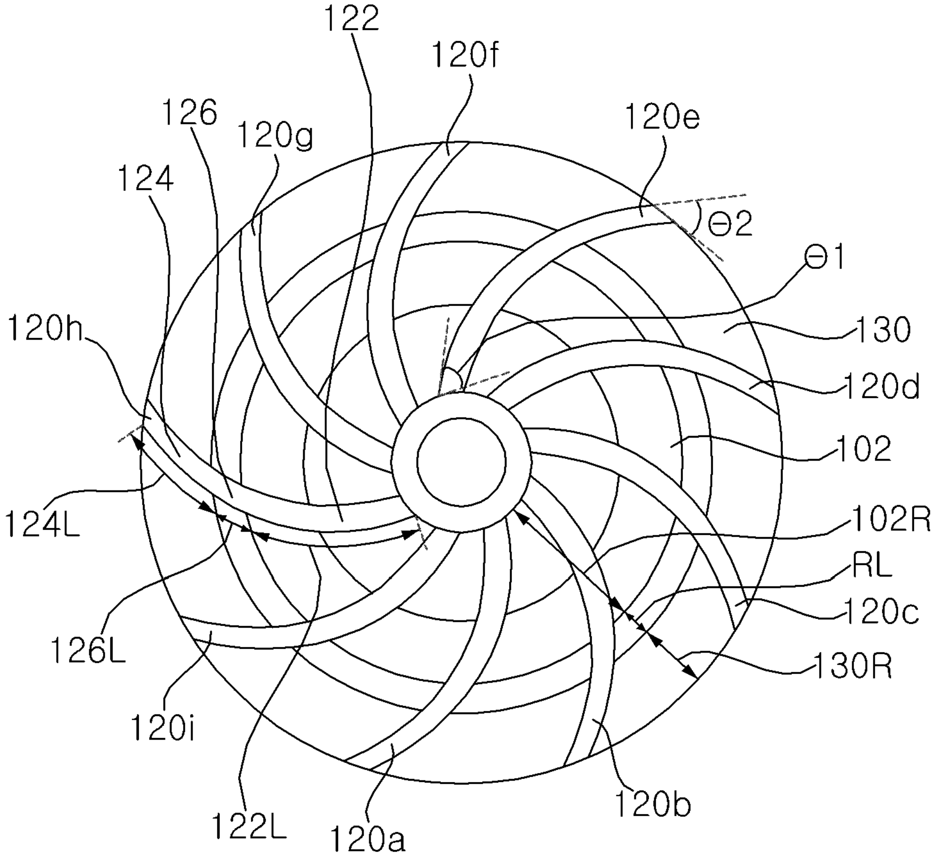

[FIG. 3D]
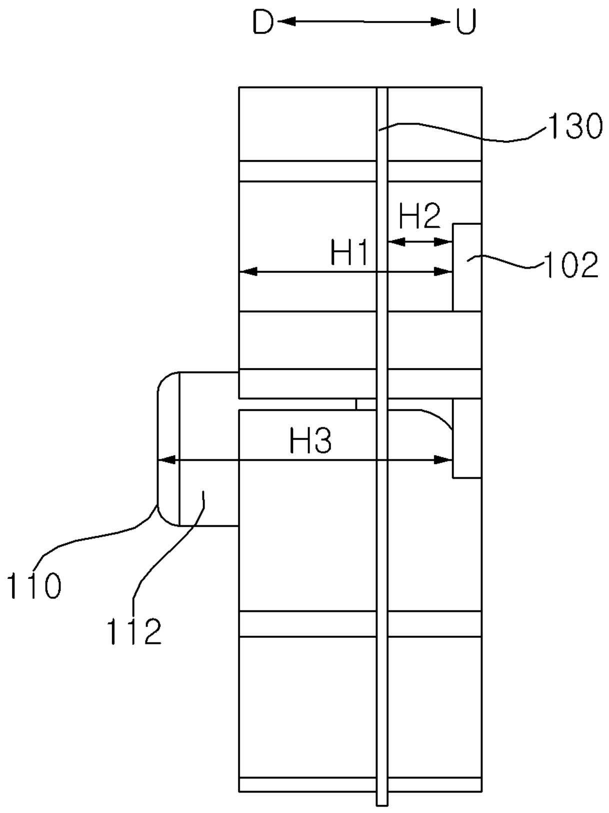

[FIG. 4]
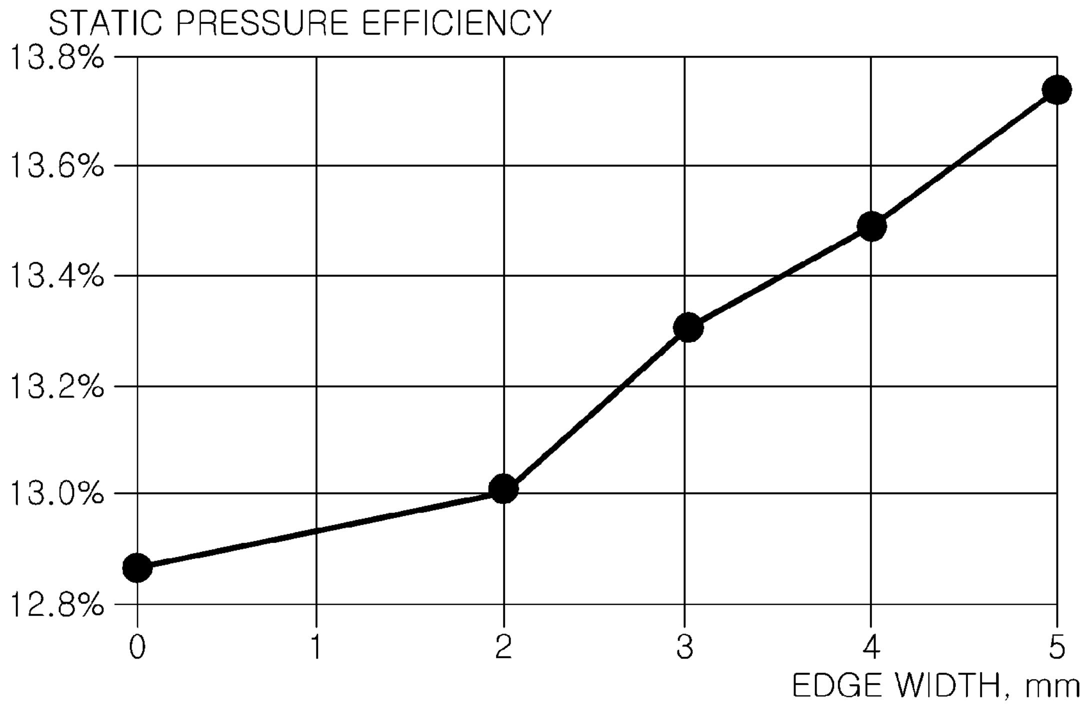
[FIG. 5]
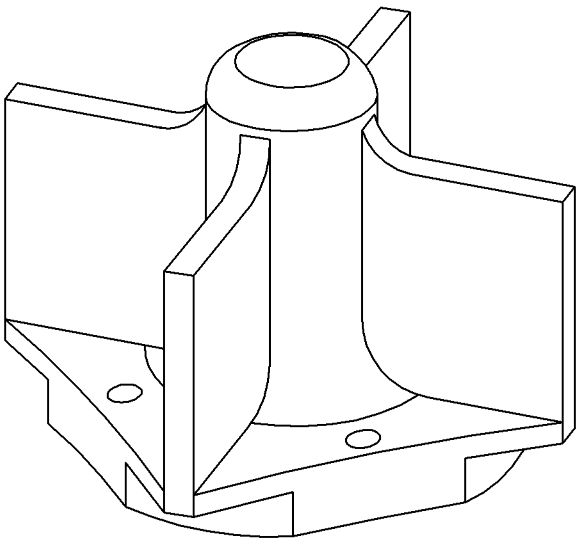

[FIG. 6]
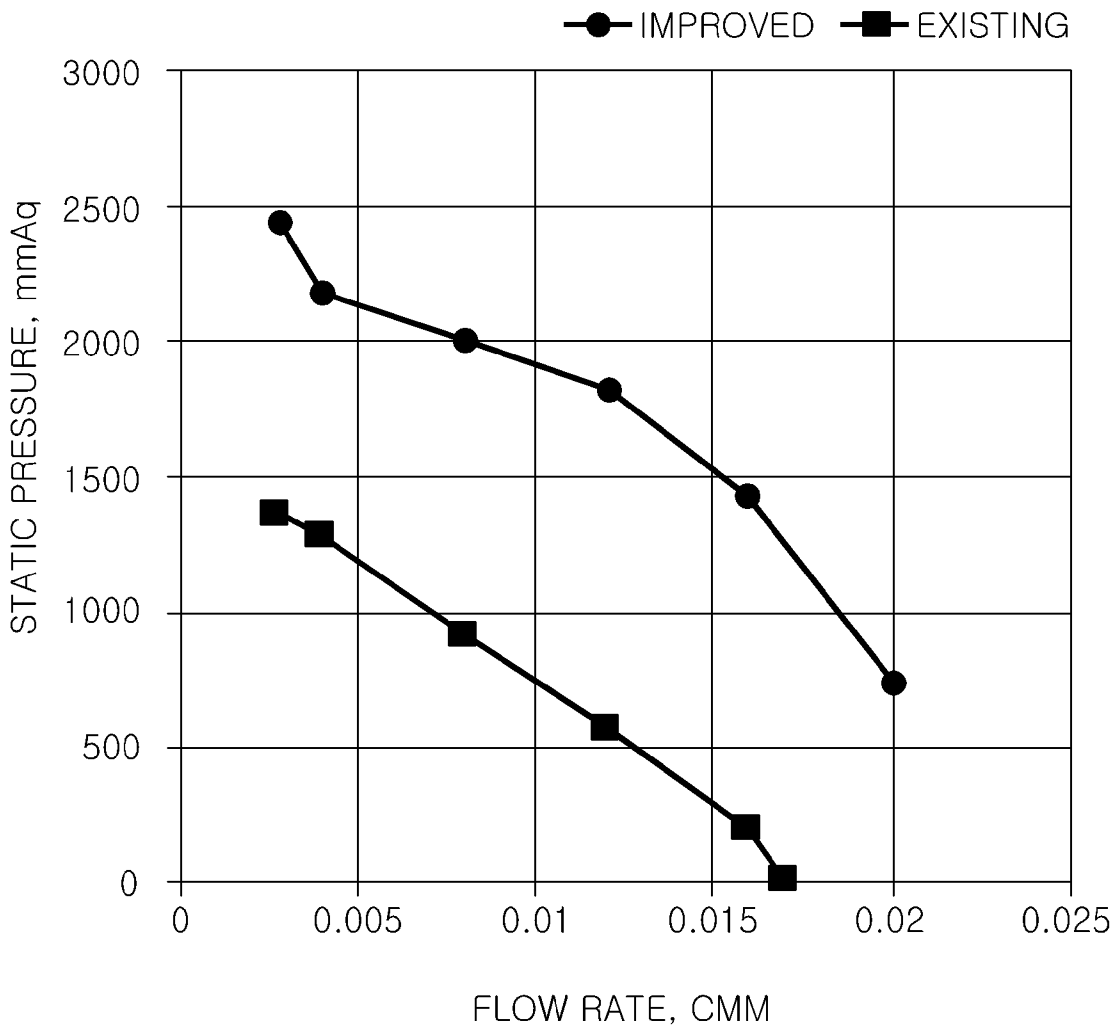

[FIG. 7]
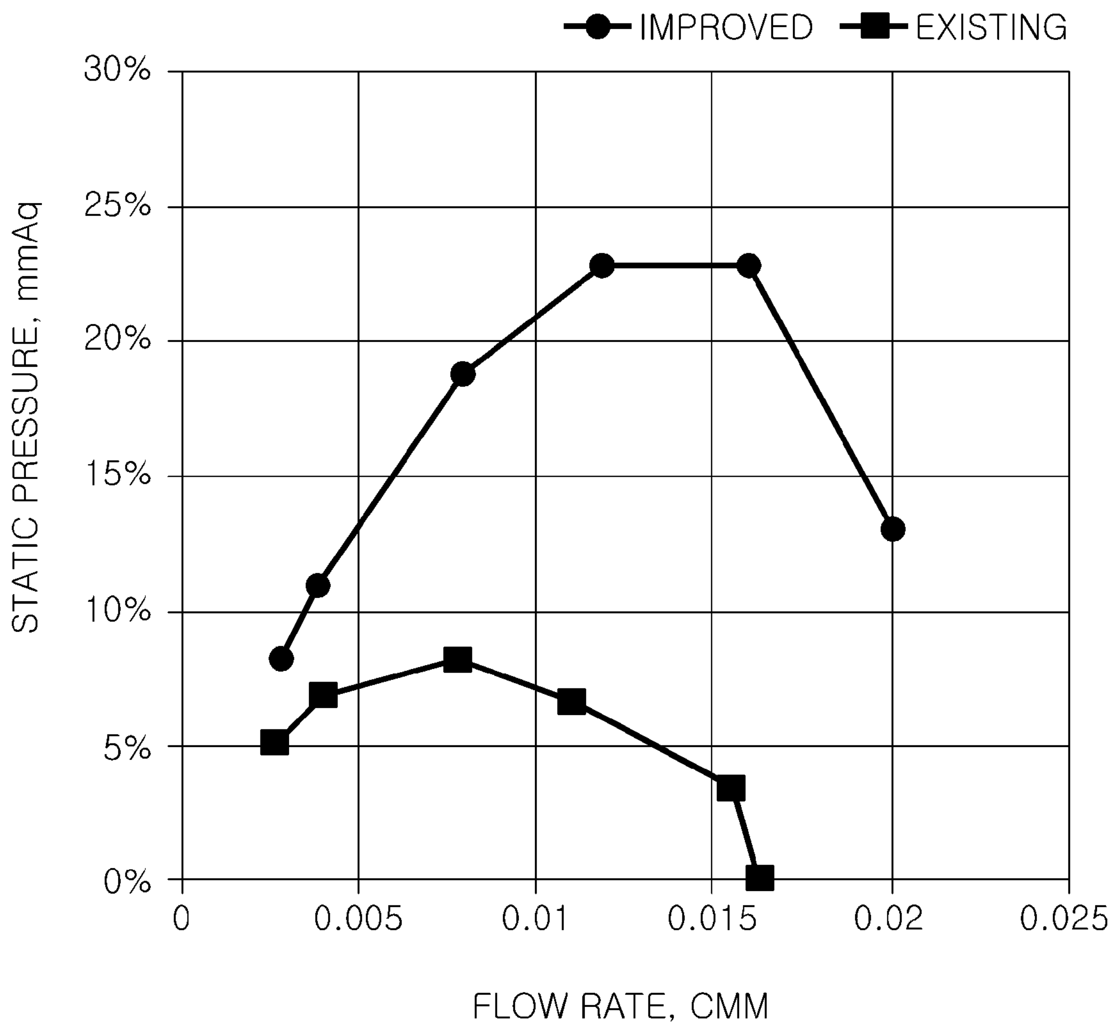

PUMP

CROSS-REFERENCE TO RELATED PATENT APPLICATIONS

This application is a U.S. National Stage Application under 35 U.S.C. § 371 of PCT Application No. PCT/KR2021/001256, filed Jan. 29, 2021, which claims priority to Korean Patent Application No. 10-2020-0011688, filed Jan. 31, 2020, whose entire disclosures are hereby incorporated by reference.

TECHNICAL FIELD

The following description relates to a pump, and more particularly to a pump for use in a clothes treatment apparatus.

BACKGROUND ART

Generally, centrifugal blades are mainly used for a pump impeller, and types of blades may be classified into a radial blade and a turbo blade.

The radial blade has the effect that even when a rotation direction of a motor is reversed (when a symmetrical scroll is used), performance of the radial blade may be maintained, thereby providing convenience in model commonization and the like, and reducing production costs. By contrast, the turbo blade has excellent efficiency, but its rotation direction is fixed, and performance of the turbo blade varies depending on a blade design that is matched to a surrounding channel structure.

Korean Laid-open Patent Publication No. KR10-2018-0097389 discloses a pump to which the radial blades are applied. However, when the pump is used in a clothes treatment apparatus and the like, noise may occur when wash water is discharged to the outside or condensate produced during drying is discharged to the outside or sent to a predetermined internal component. The noise becomes severe particularly when there is an insufficient flow, thereby causing inconvenience to users.

DISCLOSURE OF INVENTION

Technical Problem

It is an object of the present disclosure to provide a pump with an impeller, in which by increasing a flow rate to reduce the number of rotations of the impeller, an absolute magnitude of noise may be reduced.

It is another object of the present disclosure to provide a pump capable of achieving optimal performance in arrangement and shape of components included in the impeller.

It is yet another object of the present disclosure to provide a pump capable of maximizing a flow rate versus static pressure efficiency during rotation of the impeller.

The objects of the present disclosure are not limited to the aforementioned objects and other objects not described herein will be clearly understood by those skilled in the art from the following description.

Technical Solution

In order to achieve the above objects, a pump of the present disclosure includes: a housing; an impeller disposed in the housing and rotating to generate a flow of fluid; and a pump motor configured to rotate the impeller. The impeller of the present disclosure includes: a first plate having a disk shape; a boss extending vertically from a center of the first plate, and coupled to a rotating shaft of the pump motor; a plurality of blades extending from an outer circumferential surface of the boss in a radial direction of the first plate; and a second plate having a surface parallel to the first plate, spaced apart from the first plate by a predetermined distance, and connected to the plurality of blades, thereby securing a flow rate with a stable structure.

The plurality of blades may have a shape projecting from a circumferential surface of the boss, and may project radially outwardly from an outer circumference of the first plate, thereby increasing a flow rate.

The plurality of blades may be disposed perpendicular to the first plate; and the respective blades may have a bent shape, thereby increasing torque applied to a fluid during rotation in one direction.

An inclination angle between the plurality of blades and a tangent line of the circumferential surface of the boss may be greater than an inclination angle between the plurality of blades and a tangent line of an outer circumference of the second plate, thereby reducing noise caused by the rotation of the impeller.

The respective blades may have an inner blade coming into contact with the first plate, an outer blade coming into contact with the second plate, and a connection blade disposed between the inner blade and the outer blade, wherein a length of the inner blade in a radial direction may be longer than a length of the outer blade in a radial direction; and the length of the outer blade in the radial direction may be longer than a length in a radial direction of the connection blade.

The second plate may have a ring-shaped inner side which is open at top and bottom; and may be connected to the respective blades on an upper surface and a lower surface.

The second plate may be spaced apart radially outwardly from the outer circumference of the first plate; and may be spaced apart from the first plate in a direction in which the boss projects from the first plate.

The second plate may be spaced apart radially outwardly from the first plate by a length one-third to one-half of a width size in a radial direction of the second plate.

The second plate may be spaced apart from the first plate by a length one-third to one-half of a height of the plurality of blades vertically projecting from the first plate.

Other detailed matters of the embodiments are included in the detailed description and the drawings.

Advantageous Effects

The pump of the present disclosure has one or more of the following effects.

First, a plurality of blades, disposed perpendicular to a first plate and having a curved surface, are arranged at regular intervals and connected to a second plate at the outside of the blades, thereby increasing a flow rate of the pump, and minimizing noise caused by the pump.

Second, the plurality of blades have a curved shape and are disposed outwardly in a radial direction of the first plate, and a tangent line to a virtual circle around the center of rotation varies outwardly in a radial direction of the blades, thereby achieving optimal performance.

Third, by providing a structure in which the second plate is spaced apart from the first plate, a flow rate versus static pressure efficiency may be maximized during rotation of the impeller for the same flow rate range.

The effects of the present disclosure are not limited to the aforesaid, and other effects not described herein will be clearly understood by those skilled in the art from the following description of the appended claims.

DESCRIPTION OF DRAWINGS

FIG. 1 is an exploded perspective view of a pump according to embodiments of the present disclosure.

FIG. 2 is a cross-sectional view of a pump according to embodiments of the present disclosure.

FIG. 3A is a perspective view of an impeller according to embodiments of the present disclosure.

FIG. 3B is a perspective view of the other side of FIG. 3A.

FIG. 3C is a plan view of FIG. 3A.

FIG. 3D is a side view of FIG. 3A.

FIG. 4 is a diagram illustrating static pressure efficiency according to an increase in thickness of a second plate of the present disclosure.

FIG. 5 is a perspective view of an impeller according to a related art.

FIG. 6 is a diagram illustrating a flow rate versus static pressure in an impeller of the present disclosure and the impeller of FIG. 5 at the same number of revolutions.

FIG. 7 is a diagram illustrating static pressure efficiency in an impeller of the present disclosure and the impeller of FIG. 5 at the same number of revolutions.

MODE FOR INVENTION

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

Hereinafter, a pump including an impeller according to embodiments of the present disclosure will be described with reference to the accompanying drawings.

<Pump>

A pump 10 of the present disclosure may be disposed in a clothes dryer or a washing machine. The pump 10 of the present disclosure may serve as a pump for discharging condensate, generated in the clothes dryer, to the outside or for forcibly transferring the condensate to a specific area for cleaning.

The pump 10 may include a housing 12, a pump motor mounting portion 14, an impeller 100, and a pump case 44.

The housing 12 may include a bottom portion and a side portion extending upward from edges of the bottom portion, to form a space in which the pump motor mounting portion 14 is accommodated.

In addition, the pump motor mounting portion 14, on which the pump motor 42 is mounted, is formed at the bottom portion of the housing 12, and the pump motor mounting portion 14 may be stepped downward to a predetermined depth. An impeller hole 12*a*, through which the impeller 100 passes, may be formed with a predetermined size inside the pump motor mounting portion 14. A diameter of the impeller hole 12*a* is smaller than a diameter of the pump motor mounting portion 14, such that the pump motor 42 may be mounted in the pump motor mounting portion 14.

A discharge port 16 may protrude by a predetermined length from any portion of the bottom of the housing 12 which is spaced apart from the pump motor mounting portion 14, and a drain hose (not shown) may be connected to the discharge port 16. The discharge port 16 may communicate with a pump case 24 coupled to a bottom surface of the housing 12, such that wash water pumped from the pump case 24 may be discharged from the drain hose through the discharge port 16.

A flow guide rib 18 extends downward from the bottom surface of the bottom portion of the housing 12, and the impeller 100 is accommodated in a space formed inwardly of the flow guide rib 18. When the pump case 24 is coupled to the bottom surface of the housing 12, a lower end of the flow guide rib 18 may be in close contact with a bottom of the pump case 24.

The pump case 24 has a size for accommodating the flow guide rib 18. The pump case 24 has a size greater than the flow guide rib 18, but has a shape substantially the same as the flow guide rib 18.

A suction hole 24*a* is formed in the bottom of the pump case 24. As the impeller 100 rotates, wash water flows toward the inside of the flow guide rib 18 through the suction hole 24*a* and may be discharged through the discharge port 16.

<Impeller>

The impeller 22 may include a first plate 102 having a disk shape and connected to the pump motor mounting portion 14, a boss 110 disposed perpendicular to the first plate 102, extending by a predetermined length from the center of the first plate 102, and coupled to a rotating shaft of the pump motor mounting portion 14, a plurality of blades 120*a*, 120*b*, 120*c*, 120*d*, 120*e*, 120*f*, 120*g*, 120*h*, and 120*i* extending from an outer circumferential surface of the boss 110 in a radial direction of the first plate 102, and a second plate 130 spaced apart from the first plate 102 by a predetermined distance, having a surface parallel to the first plate 102, and connected to the plurality of blades 120*a*, 120*b*, 120*c*, 120*d*, 120*e*, 120*f*, 120*g*, 120*h*, and 120*i*.

The first plate 102 has a disk shape. A boss hole 104, which is open toward the boss 110 on one surface facing the pump motor 20, is formed in the first plate 102. The boss 110 is disposed at the center of the first plate 102.

The boss 110 projects downwardly from the center of the first plate 102. The boss 110 is fastened to the pump motor mounting portion 14 to rotate the entire impeller 22. The boss 110 may have a cylindrical shape that projects downwardly.

The plurality of blades 120*a*, 120*b*, 120*c*, 120*d*, 120*e*, 120*f*, 120*g*, 120*h*, and 120*i* are disposed at the first plate 102 in a projecting direction of the boss 110. The plurality of blades 120*a*, 120*b*, 120*c*, 120*d*, 120*e*, 120*f*, 120*g*, 120*h*, and 120*i* may projects radially from a circumferential surface 112 of the boss 110. Referring to FIG. 3C, the plurality of blades 120*a*, 120*b*, 120*c*, 120*d*, 120*e*, 120*f*, 120*g*, 120*h*, and 120*i* may be nine in number. However, this is merely an example, and the plurality of blades may be five or eight in number. Further, the number of the blades may exceed nine.

The plurality of blades 120*a*, 120*b*, 120*c*, 120*d*, 120*e*, 120*f*, 120*g*, 120*h*, and 120*i* may have a shape projecting from one side surface of the first plate 102. The plurality of blades 120*a*, 120*b*, 120*c*, 120*d*, 120*e*, 120*f*, 120*g*, 120*h*, and 120*i* may project from the circumferential surface 112 of the boss 110. The plurality of blades 120*a*, 120*b*, 120*c*, 120*d*, 120*e*, 120*f*, 120*g*, 120*h*, and 120*i* may be disposed perpendicular to the first plate 120.

Each of the plurality of blades 120*a*, 120*b*, 120*c*, 120*d*, 120*e*, 120*f*, 120*g*, 120*h*, and 120*i* may have a surface perpendicular to the first plate 102, and the surface of the each of the plurality of blades 120, 120*b*, 120*c*, 120*d*, 120*e*, 120*f*, 120*g*, 120*h*, and 120*i* may have a bent shape. The plurality of blades 120, 120*b*, 120*c*, 120*d*, 120*e*, 120*f*, 120*g*, 120*h*, and 120*i* have a shape which is bent in a direction in which an inclination angle between the plurality of blades and a tangent line of the circumferential surface 112 of the boss 110 decreases. That is, referring to FIG. 3C, an inclination angle 81 (hereinafter referred to as an "inlet angle") between the plurality of blades 120*a*, 120*b*, 120*c*, 120*d*, 120*e*, 120*f*, 120*g*, 120*h*, and 120*i* and the tangent line of the circumferential surface 112 of the boss 110 is greater than an inclination angle 82 (hereinafter referred to as an "outlet angle") between the plurality of blades 120*a*, 120*b*, 120*c*, 120*d*, 120*e*, 120*f*, 120*g*, 120*h*, and 120*i* and the tangent line of an outer circumference of the second plate 130.

Each of the plurality of blades 120*a*, 120*b*, 120*c*, 120*d*, 120*e*, 120*f*, 120*g*, 120*h*, and 120*i* may have a curved surface which is convex in the same direction. An inner end 121*a* of each of the plurality of blades 120*a*, 120*b*, 120*c*, 120*d*, 120*e*, 120*f*, 120*g*, 120*h*, and 120*i* comes into contact with the circumferential surface of the boss 110. An outer end 121*b* of each of the plurality of blades 120*a*, 120*b*, 120*c*, 120*d*, 120*e*, 120*f*, 120*g*, 120*h*, and 120*i* is disposed furthest away from the circumferential surface 112 of the boss 110.

A height H! of the plurality of blades 120*a*, 120*b*, 120*c*, 120*d*, 120*e*, 120*f*, 120*g*, 120*h*, and 120*i* projecting from the first plate 102 may be smaller than a height H3 of the boss 110 projecting from the first plate 102. A length 120L of the plurality of blades 120*a*, 120*b*, 120*c*, 120*d*, 120*e*, 120*f*, 120*g*, 120*h*, and 120*i* projecting from the circumferential surface 112 of the boss 110 is longer than a length 102R of the first plate 102 projecting radially from the boss 110.

Each of the plurality of blades 120*a*, 120*b*, 120*c*, 120*d*, 120*e*, 120*f*, 120*g*, 120*h*, and 120*i* may have the same shape and size. The plurality of blades 120*a*, 120*b*, 120*c*, 120*d*, 120*e*, 120*f*, 120*g*, 120*h*, and 120*i* may be spaced apart at equal intervals from the circumferential surface 112 of the boss 110.

Each of the plurality of blades 120*a*, 120*b*, 120*c*, 120*d*, 120*e*, 120*f*, 120*g*, 120*h*, and 120*i* may have an inner blade 122 coming into contact with the first plate 102, an outer blade 124 coming into contact with the second plate 130, and a connection blade 126 disposed between the inner blade 122 and an outer blade 124. A length 122L of a curved surface of the inner blade 122 is longer than a length 124L of a curved surface of the outer blade 124. The length 124L of the curved surface of the outer blade 124 is longer than a length 126L of a curved surface of the connection blade 126.

Referring to FIG. 3B, the plurality of blades 120*a*, 120*b*, 120*c*, 120*d*, 120*e*, 120*f*, 120*g*, 120*h*, and 120*i* may have the same surface as an upper surface of the first plate 102 at an outer portion of the first plate 102.

The second plate 130 may have a ring-shaped inner side that is open at the top and bottom. The second plate 130 may be radially spaced apart from an outer circumference of the first plate 102. The second plate 130 may be spaced apart radially outwardly from the first plate 102 by a length ( ) one-third to one-half of a width size 130R in a radial direction of the second plate 130.

The second plate 130 may be spaced apart downwardly from the first plate 102. The second plate 130 may be spaced apart from the first plate 102 by a length H2 one-third to one-half of a height H1 in a downward direction of the blades.

Referring to FIG. 4, it can be seen that as the width size 130R of the second plate 130 increases, static pressure efficiency may also increase. However, if the second plate 130 becomes excessively large, a load imposed on the pump motor 20 increases, such that the width size 130R of the second plate 130 may be formed with a length one-third to one-half of the length 102R of the first plate 102 formed radially from the boss 110.

The second plate 130 may come into contact with the outer blade 124 of each of the plurality of blades 120*a*, 120*b*, 120*c*, 120*d*, 120*e*, 120*f*, 120*g*, 120*h*, and 120*i*. The plurality of blades 120*a*, 120*b*, 120*c*, 120*d*, 120*e*, 120*f*, 120*g*, 120*h*, and 120*i* may be disposed on an upper surface and a lower surface of the second plate 130.

<Comparison and Effect>

Referring to FIG. 6, it can be seen that by using the impeller 22 according to the present disclosure, a high flow rate may be generated at the same pressure compared to an existing impeller. Referring to FIG. 7, it can be seen that by using the impeller 22 according to the present disclosure, static pressure efficiency increases compared to the existing impeller. Particularly, at a flow rate of 0.0166 CMM to 0.022 CMM, at which the pump motor 20 is typically used, the static pressure efficiency greatly increases by 10% or more.

While the present disclosure has been shown and described with reference to certain embodiments thereof, it will be understood by those skilled in the art that various changes in form and details may be made therein without departing from the spirit and scope of the present invention as defined by the appended claims. Therefore, various modifications can be made to the present disclosure without departing from the subject of the present disclosure claimed in the appended claims, and the modifications should not construed separately from the technical idea or prospect of the present disclosure.

The invention claimed is:

1. A pump comprising:
- a housing;
- an impeller disposed in the housing and rotating to generate a flow of fluid; and
- a pump motor configured to rotate the impeller,
- wherein the impeller comprises:
  - a boss coupled to a rotating shaft of the pump motor;
  - a first plate extending radially from an upper end of the boss and having a disk shape;
  - a plurality of blades extending from an outer circumferential surface of the boss in a radial direction, a portion of an upper end of each of the plurality of blades being in contact with the first plate; and
  - a second plate having a surface parallel to the first plate, spaced downward from the first plate by a predetermined distance, and connected to the plurality of blades, and
- wherein a width of the second plate in the radial direction is greater than a distance which the second plate is radially spaced from the first plate, and is less than a length of the first plate in the radial direction from the boss.

2. The pump of claim 1, wherein the plurality of blades have a shape projecting from a circumferential surface of the boss, and project radially outwardly from an outer circumference of the first plate.

3. The pump of claim 1, wherein:

the plurality of blades are disposed perpendicular to the first plate; and the respective blades have a bent shape.

4. The pump of claim 1, wherein an inclination angle between the plurality of blades and a tangent line of the circumferential surface of the boss is greater than an inclination angle between the plurality of blades and a tangent line of an outer circumference of the second plate.

5. The pump of claim 1, wherein the respective blades have an inner blade coming into contact with the first plate, an outer blade coming into contact with the second plate, and a connection blade disposed between the inner blade and the outer blade.

6. The pump of claim 5, wherein:

a length of the inner blade in the radial direction is greater than a length of the outer blade in the radial direction; and the length of the outer blade in the radial direction is greater than a length in the radial direction of the connection blade.

7. The pump of claim 1, wherein the second plate has a ring-shaped inner side which is open at top and bottom; and each of an upper surface and a lower surface of the second plate is connected to each of the plurality of blades.

8. The pump of claim 1, wherein the second plate is spaced apart radially outwardly from the outer circumference of the first plate; and wherein the second plate is spaced apart from the first plate in a direction in which the boss projects from the first plate.

9. The pump of claim 1, wherein the second plate is spaced apart radially outwardly from the first plate by a length one-third to one-half of the width in the radial direction of the second plate.

10. The pump of claim 1, wherein the second plate is spaced apart from the first plate by a length one-third to one-half of a height of the plurality of blades vertically projecting from the first plate.

* * * * *